US012560068B2

(12) United States Patent
Alarawi et al.

(10) Patent No.: US 12,560,068 B2
(45) Date of Patent: Feb. 24, 2026

(54) METHODS FOR INCREASING THE MECHANICAL STRENGTH OF SUBTERRANEAN FORMATIONS USING MXene-CONTAINING FLUIDS

(71) Applicant: SAUDI ARABIAN OIL COMPANY, Dhahran (SA)

(72) Inventors: Abeer Ateeq Alarawi, Dhahran (SA); Jehad Khaled Eldemellawi, Thuwal (SA); Murtadha J. Altammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/665,373

(22) Filed: May 15, 2024

(65) Prior Publication Data

US 2025/0354470 A1    Nov. 20, 2025

(51) Int. Cl.
*E21B 43/27* (2006.01)
*C09K 8/502* (2006.01)
*C09K 8/504* (2006.01)

(52) U.S. Cl.
CPC .............. *E21B 43/27* (2020.05); *C09K 8/502* (2013.01); *C09K 8/5045* (2013.01)

(58) Field of Classification Search
None
See application file for complete search history.

(56) References Cited

U.S. PATENT DOCUMENTS

| | | | | |
|---|---|---|---|---|
| 10,883,035 | B2 | 1/2021 | De Stefano et al. | |
| 2013/0274154 | A1* | 10/2013 | Nasr-El-Din | C09K 8/86 |
| | | | | 507/241 |

| | | | | |
|---|---|---|---|---|
| 2016/0319179 | A1* | 11/2016 | De Stefano | C09K 8/36 |
| 2016/0319180 | A1* | 11/2016 | De Stefano | C09K 8/502 |
| 2016/0326423 | A1* | 11/2016 | Yang | C09K 8/035 |
| 2017/0114267 | A1* | 4/2017 | Lahman | C09K 8/516 |

FOREIGN PATENT DOCUMENTS

| | | |
|---|---|---|
| CN | 110157405 B | 8/2019 |
| CN | 110746956 A | 2/2020 |
| CN | 115785942 A | 3/2023 |
| CN | 116478669 A | 7/2023 |
| EP | 3950878 A1 | 2/2022 |
| WO | 2021087658 A1 | 5/2021 |

OTHER PUBLICATIONS

Ferreira Pinto, A., & Delgado Rodrigues, J. (2012). Consolidation of carbonate stones: Influence of treatment procedures on the strengthening action of consolidants. Journal Of Cultural Heritage, 13(2), 154-166. doi: 10.1016/j.culher.2011.07.003.

Li, Y., Huang, S., Wei, C. et al. Adhesion of two-dimensional titanium carbides (MXenes) and graphene to silicon. Nat Commun 10, 3014 (2019). https://doi.org/10.1038/s41467-019-10982-8, 8 pages.

* cited by examiner

*Primary Examiner* — Anuradha Ahuja
(74) *Attorney, Agent, or Firm* — Vorys, Sater, Seymour and Pease LLP

(57)    ABSTRACT

Methods for increasing the mechanical strength of subterranean formations using MXene-containing fluids may include introducing a plurality of MXene flakes into a subterranean formation comprising a carbonate mineral; and depositing at least a portion of the MXene flakes upon a surface of the carbonate mineral, within a plurality of pores of the carbonate mineral, or any combination thereof to increase a mechanical strength of the carbonate mineral.

17 Claims, No Drawings

METHODS FOR INCREASING THE MECHANICAL STRENGTH OF SUBTERRANEAN FORMATIONS USING MXene-CONTAINING FLUIDS

FIELD OF THE DISCLOSURE

The present disclosure relates generally to subterranean stimulation operations and, more particularly, to the consolidation of carbonate minerals within subterranean formations.

BACKGROUND OF THE DISCLOSURE

Stimulation operations are commonly used during oil and gas production to increase the productivity of a subterranean formation by increasing the permeability of the formation matrix. Common stimulation operations include hydraulic fracturing, matrix acidizing, or acid-fracturing technologies.

Hydraulic fracturing may introduce a fluid into a subterranean formation at a high pressure to generate conductive pathways, commonly referred to as fractures, within the formation matrix. The fractures may increase the permeability of the subterranean formation and improve hydrocarbon production. Hydraulic fracturing operations commonly utilize particulates, referred to as proppants, to keep the fractures open after the hydraulic pressure is released. As used herein, the term "proppant" refers to particles mixed with hydraulic fracturing fluids to hold fractures open after the hydraulic pressure generated during a hydraulic fracturing operation is relieved.

Matrix acidizing generates porosity within a subterranean formation by dissolving a portion of the formation matrix to generate flow channels, commonly referred to as wormholes, therein. As used herein, the term "matrix acidizing" refers to the treatment of a subterranean formation with a fluid containing an acid that reacts with the formation matrix. Acid-fracturing operations may combine aspects of both hydraulic fracturing and matrix acidizing operations to increase the permeability of a subterranean formation.

Although hydraulic fracturing and matrix acidizing may desirably increase the permeability of a subterranean formation, these operations are not without their difficulties. In soft or ductile subterranean formations, proppants may become embedded within a fracture, thereby reducing the effective fracture width. The terms "embedment" and other grammatical forms thereof refer to the process whereby proppant particulates become at least partially pushed into the formation matrix when placed under compressive stress within a fracture, thereby decreasing the effective fracture width compared to the width of the fully open fracture. Matrix acidizing may weaken the mechanical integrity of the formation matrix and lead to the collapse of wormholes. Acids may also weaken fracture asperities in acid-fracturing operations and lead to at least partial fracture closure, even if the subterranean formation is not overly soft or ductile on the whole. The foregoing issues may be especially prevalent in aging wells. Formation damage of the foregoing types may be especially prevalent when stimulating subterranean formations comprising a carbonate mineral. Regardless of the origin or the time of occurrence in the life cycle of a well, the foregoing types of subterranean formation damage may decrease hydrocarbon production resulting from a stimulation operation due to a sub-optimal increase in permeability being realized.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for increasing the mechanical strength of subterranean formations using MXene flakes may include introducing a plurality of MXene flakes into a subterranean formation comprising a carbonate mineral; and depositing at least a portion of the MXene flakes upon a surface of the carbonate mineral, within a plurality of pores of the carbonate mineral, or any combination thereof to increase a mechanical strength of the carbonate mineral.

In another embodiment, methods for increasing the mechanical strength of subterranean formations using MXene-containing fluids may include stimulating a subterranean formation comprising a carbonate mineral by performing matrix acidizing, hydraulic fracturing, acid-fracturing, or any combination thereof upon the subterranean formation to form a plurality of flow pathways; after forming the plurality of flow pathways, introducing a plurality of MXene flakes into the subterranean formation; wherein the plurality of MXene flakes are dispersed in a carrier fluid when introduced into the subterranean formation; and depositing at least a portion of the MXene flakes upon a surface of the carbonate mineral, within a plurality of pores of the carbonate mineral, or any combination thereof to increase a mechanical strength of the carbonate mineral.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to subterranean stimulation operations and, more particularly, to the consolidation of carbonate minerals within subterranean formations.

The present disclosure addresses the difficulties associated with stimulating soft and ductile formations, such as subterranean formations comprising a carbonate mineral. In particular, the present disclosure addresses the foregoing issues by increasing the mechanical strength of a carbonate mineral within the subterranean formation to decrease the likelihood of proppant embedment and weakening of asperities following a stimulation operation. Increasing the mechanical strength of the carbonate mineral may take place through the deposition of MXene flakes upon a surface of the carbonate mineral and/or within pores of the carbonate mineral, as discussed in more detail below.

As used herein, the term "MXene" refers to a class of two-dimensional materials belonging to a broader category of transition metal carbides, nitrides, and/or carbonitrides having a layered structure, which may be generically represented by the formula $M_{n+1}X_nT_x$, wherein M is a transition metal (e.g., an early transition metal, such as titanium, vanadium, or molybdenum), X is carbon and/or nitrogen, and n is 1, 2, 3, or 4. Multiple transition metals M may be present within a given MXene. The sum 2n+1 may be representative of the number of metal atomic layers. $T_x$ denotes optional surface terminations (e.g., groups such as —H, —OH, —O, —S, —F, —Cl, —Br, for example) upon the MXene, such as upon a face of one or more outer layers comprising M. MXenes may be derived from a parent MAX phase (a family of ternary carbides, nitrides, and/or carbonitrides) through a selective etching process that removes the "A" layer to provide the corresponding MXene in single-layer or multi-layer form. Further details regarding etching processes suitable to produce MXenes will be familiar to persons having ordinary skill in the art. The properties of MXenes (e.g., mechanical strength, hydrophilicity, and the like) may be tuned by altering their composition and surface terminations. Such properties may be selected and/or designed based upon the particular chemistry of the subterranean formation undergoing consolidation according to the disclosure herein.

MXenes may exhibit high mechanical strength by virtue of their molecular structure. As such, MXene flakes, when deposited upon a surface and/or within the pores of a carbonate mineral, may enhance the mechanical strength of the carbonate mineral. MXene flakes may be prepared by a delamination process, during which the MXene flakes may become dispersed in a carrier fluid. Once suitably dispersed, solvent molecules of the carrier fluid may intercalate between the MXene flakes, which may aid the uniformity of deposition of the MXene flakes upon the carbonate mineral. Once deposited upon the surface of the carbonate mineral, the intrinsic negative charges and active surface sites of the MXene flakes may promote a strong interaction with the carbonate mineral to facilitate consolidation thereof. Because of the extended two-dimensional structure of MXene flakes, the MXene flakes may bridge adjacent particles of the carbonate mineral, thereby resulting in robust consolidation thereof. Advantageously, MXenes may accomplish the foregoing without plugging pores in the subterranean formation and consequently decreasing permeability thereof.

Accordingly, methods for increasing the mechanical strength of subterranean formations using MXene flakes are described herein. The MXene flakes may be introduced into the subterranean formation while dispersed in a suitable carrier fluid in order to accomplish the foregoing. Increasing the mechanical strength of the subterranean formation may be realized once the MXene flakes are suitably deposited within the subterranean formation. The increased mechanical strength may be evidenced by an increased elastic modulus, Poisson's ratio, hardness, or the like compared to corresponding values prior to consolidation with the MXene flakes. In some embodiments, increasing the mechanical strength of the subterranean formation using the MXene flakes may take place in conjunction with a stimulation operation, either before, during, or after conducting the stimulation operation. Preferably, the MXene flakes may be deposited upon a surface and/or within pores of the subterranean formation following a stimulation operation (e.g., fracturing, matrix acidizing, or acid-fracturing).

In some embodiments, methods of the present disclosure may comprise: introducing a plurality of MXene flakes into a subterranean formation comprising a carbonate mineral; and depositing at least a portion of the MXene flakes upon a surface of the carbonate mineral, within a plurality of pores of the carbonate mineral, or any combination thereof to increase a mechanical strength of the carbonate mineral. In some embodiments, a stimulation operation may be performed upon the subterranean formation to form a plurality of flow pathways before introducing the plurality of MXene flakes. The plurality of flow pathways may comprise a plurality of fractures, wormholes, asperities, the like, or any combination thereof, for example.

Accordingly, in some embodiments of the present disclosure, the methods may comprise first stimulating a subterranean formation comprising a carbonate mineral by performing matrix acidizing, hydraulic fracturing, acid-fracturing, or any combination thereof upon the subterranean formation to form a plurality of flow pathways; after forming the plurality of flow pathways, introducing a plurality of MXene flakes into the subterranean formation; and depositing at least a portion of the MXene flakes upon a surface of the carbonate mineral, within a plurality of pores of the carbonate mineral, or any combination thereof to increase a mechanical strength of the carbonate mineral. Depositing the MXene flakes upon a surface of the carbonate mineral may take place by processes such as sedimenting or precipitation from a carrier fluid in which the MXene flakes are dispersed.

The MXene flakes may be introduced to the subterranean formation while dispersed in a suitable carrier fluid, which may comprise an aqueous carrier fluid or a non-aqueous carrier fluid depending on application-specific considerations. The type of carrier fluid may be selected based upon the chemistry of the subterranean formation undergoing consolidation and the particular MXene being used.

Suitable aqueous carrier fluids may include, for example, fresh water (e.g., stream water, lake water, or municipal treated water), salt water (aqueous salt solutions), sea water, brine, non-potable water such as gray water or industrial process water, formation water, produced water, well water, filtered water, distilled water, or any combination thereof. Produced water may include formation water obtained from the subterranean formation or flowback water produced following stimulation of the subterranean formation with an appropriate treatment fluid. As used herein, the term "brine" refers to a saturated aqueous salt solution. An "aqueous salt solution" has a salt concentration (salinity) less than that of brine.

Suitable non-aqueous carrier fluids may include, but are not limited to, organic solvents such as ethanol, N,N-dimethylformamide, N-methylformamide, N-methyl-2-pyrrolidone, dimethyl sulfoxide, the like, and any combination thereof.

Dispersion quality and chemical stability of the MXene flakes in aqueous and/or non-aqueous carrier fluids may be optimized and enhanced, for example, by altering the surface functionalization of the MXene flakes. Suitable techniques to introduce surface functionalization upon the MXene flakes will be familiar to persons having ordinary skill in the art.

The MXene flakes may have a concentration in the carrier fluid ranging from about 1 mg/mL to about 10 mg/mL, or about 1 mg/mL to about 7.5 mg/mL or about 1 mg/mL to about 5 mg/mL, or about 1 mg/mL to about 2.5 mg/mL, or about 2.5 mg/mL to about 10 mg/mL, or about 2.5 mg/mL to about 7.5 mg/mL, or about 2.5 mg/mL to about 5 mg/mL, or about 5 mg/mL to about 10 mg/mL, or about 5 mg/mL to about 7.5 mg/mL, or about 7.5 mg/mL to about 10 mg/mL.

The carrier fluid may have a viscosity of about 1 Pa·s to about 300 Pa·s, or about 1 Pa·s to about 200 Pa·s, or about 1 Pa·s to about 100 Pa·s, or about 1 Pa·s to about 10 Pa·s, or about 10 Pa·s to about 300 Pa·s, or about 10 Pa·s to about 200 Pa·s, or about 10 Pa·s to about 100 Pa·s, or about 100 Pa·s to about 300 Pa·s, or about 100 Pa·s to about 200 Pa·s, or about 200 Pa·s to about 300 Pa·s. Without being bound by any theory, the viscosity of the carrier fluid may be affected by a concentration of MXene flakes and may be adjusted to a desired consistency depending on properties of the MXene flakes and/or the subterranean formation.

In the disclosure herein, the subterranean formation may comprise a carbonate mineral comprising calcium (e.g., calcium carbonate). Examples of carbonate minerals comprising calcium that may be mechanically strengthened through the disclosure herein include, but are not limited to, calcite, aragonite, vaterite, dolomite, the like, and any combination thereof. The calcium carbonate may be in the form of limestone, chalk, marble, or any combination thereof.

In the disclosure herein, the carbonate mineral may be altered by depositing (sedimenting) MXene flakes onto a surface of the carbonate mineral and/or within pores of the carbonate mineral. The MXene flakes, once deposited upon the carbonate mineral in one or more locations, may enhance the mechanical strength of the carbonate mineral. In the process of the MXene flakes becoming dispersed in the carrier fluid, the MXene flakes may undergo delamination and suspension in the carrier fluid. These stages may allow the solvent molecules of the carrier fluid to intercalate between layers of the MXene flakes to promote exfoliation and dispersion. Subsequently, the MXene flakes deposited upon the carbonate mineral may bond to the carbonate mineral through physisorption and/or chemisorption, which may increase the mechanical strength or similar mechanical property of the subterranean formation matrix.

As referenced above, suitable MXene flakes may include, but are not limited to, transition metal carbides, nitrides, carbonitrides, the like, and any combination thereof.

The MXene flakes may, for example, have a particle size of about 500 nm to about 10 μm, or about 500 nm to about 1 μm, or about 500 nm to about 750 nm, or about 750 nm to about 10 μm, or about 750 nm to about 1 μm, or about 1 μm to about 10 μm.

The MXene flakes may, for example, have a thickness of about 1.5 nm to about 90 nm, or about 1.5 nm to about 50 nm, or about 1.5 nm to about 25 nm, or about 1.5 nm to about 10 nm, or about 10 nm to about 90 nm, or about 10 nm to about 50 nm, or about 10 nm to about 25 nm, or about 25 nm to about 90 nm, or about 25 nm to about 50 nm, or about 50 nm to about 90 nm. In MXenes having such thicknesses, the MXenes may contain about 1 to about 60, or about 1 to about 50, or about 1 to about 25, or about 1 to about 10, or about 10 to about 60, or about 10 to about 50, or about 10 to about 25, or about 25 to about 60, or about 25 to about 50, or about 50 to about 60 metal carbide, nitride, or carbonitride layers. This range may be defined based on the stoichiometry of the MXene. For example, MXene titanium(III) carbide may have a monolayer thickness of about 1.5 nm, equivalent to 5 atomic layers (three titanium layers and two carbon layers).

In addition, the MXene flakes may have a flake pore size of about 0.01 nm to about 4 nm, or about 0.01 nm to about 2 nm, or about 0.01 nm to about 1 nm, or about 0.01 nm to about 0.1 nm, or about 0.1 nm to about 4 nm, or about 0.1 nm to about 2 nm, or about 0.1 nm to about 1 nm, or about 1 nm to about 4 nm, or about 1 nm to about 2 nm, or about 2 nm to about 4 nm. The foregoing refers to the size of pores introduced into the MXene layers.

Depositing, sedimenting, and/or precipitating the MXene flakes onto the carbonate mineral to increase the mechanical strength of the subterranean formation matrix may take place in conjunction with a stimulation operation. Suitable stimulation operations may include hydraulic fracturing, matrix acidizing, or acid-fracturing. When performed, the stimulation operation may take place before depositing the MXene flakes onto and/or within the carbonate mineral.

Hydraulic fracturing may be performed to increase the permeability of the subterranean formation and increase the amount of hydrocarbons produced therefrom. During a fracturing operation, a hydraulic fracturing fluid (typically containing a plurality of proppant particulates and various optional components to adjust the density and viscosity of the fracturing fluid) is pumped into the subterranean formation above a fracture gradient pressure thereof. The hydraulic pressure causes fractures to open in the subterranean formation, thereby increasing permeability thereof. Once the hydraulic pressure is released, the proppant particulates become disposed in the fractures and maintain the fractures in an open condition. The material comprising the proppant particulates may be chosen based on the particular application and characteristics desired, such as the depth of the subterranean formation in which the proppant particulates will be placed and the crush strength of the proppant particulates under reservoir conditions at the specified subterranean depth. In some cases, the chemistry of the subterranean formation may also be considered when selecting suitable proppant particulates. Optionally, a protective and/or hardening coating, such as a resin or epoxy coating, may be applied to the proppant particulates to modify or customize the density or mechanical strength of a selected base proppant material. Selection of suitable proppant particulates for performing a given stimulation operation will be within the capabilities of a person having ordinary skill in the art.

Hydraulic fracturing may include three main stages: a pad fluid stage, a proppant-containing fluid stage, and an overflush fluid stage. The pad fluid stage may include pumping a pad fluid into a subterranean formation, which may initiate and propagate fractures in the subterranean formation. The proppant-containing fluid stage may include pumping a proppant-containing fluid into the fractures of the formation, which may facilitate lodging of proppants in the fractures and creating conductive fractures through which hydrocarbons may flow. The overflush fluid stage may include pumping an overflush fluid into the fractures to push the proppant deeper inside the fractures. The MXene may be introduced to the subterranean formation during any of the foregoing stages. Alternately, the MXene may be introduced to the subterranean formation after the overflush fluid stage is complete.

Matrix acidizing may similarly be performed to increase permeability of the subterranean formation and increase the amount of hydrocarbons produced therefrom. During matrix acidizing, an acidizing fluid may be employed to stimulate the subterranean formation by dissolving at least a portion of the carbonate mineral in the formation matrix to promote wormhole generation therein. In a carbonate formation, the acid in the acidizing fluid may dissolve portions of the formation matrix, thereby increasing porosity of the formation matrix. The acidizing operation may form a plurality of asperities within the subterranean formation (i.e., asperities associated with the wormholes formed therein). Deposition of the MXene flakes upon the carbonate mineral may stabilize and increase the mechanical strength of the wormholes and asperities according to the disclosure herein.

Suitable acidizing fluids may comprise an aqueous acid solution, which may comprise any one or a combination of one or more strong acids and/or one or more weak acids. The term "strong acid" refers to any acid with a logarithmic acid dissociation constant (pK$_a$) value that is less than or equal to 1.0, and the term "weak acid" refers to any acid with a $pK_a$ value that is greater than 1.0. Strong acids that may be present in an acidizing fluid for a carbonate formation may include, but are not limited to, hydrochloric acid, hydrobromic acid, nitric acid, sulfuric acid, the like, and any combination thereof. Weak acids that may be present in an acidizing fluid for a carbonate formation may include, but are not limited to, acetic acid, formic acid, methanesulfonic acid, trifluoromethanesulfonic acid, trifluoroacetic acid, the like, and any combination thereof. In non-limiting examples, the aqueous acid solution may comprise one or more strong and/or weak acids at a concentration ranging from about 10 wt % to about 70 wt %, or about 25 wt % to about 60 wt. %, or about 30 wt % to about 50 wt %, or about 45 wt % to about 60 wt %, or about 35 wt % to about 50 wt %, based on total mass of the acidizing fluid.

Suitable acidizing operations may include pumping a displacement fluid, also referred to as a flush fluid, into the subterranean formation after the acidizing fluid. The displacement fluid may force the acidizing fluid deeper into the subterranean formation and promote wormhole formation therein to increase the porosity of the formation matrix. The displacement fluid may be pumped until all, or nearly all, of the acidizing fluid has been forced into the subterranean formation. In some cases, an acidizing fluid may be incompatible with fluids already present within the subterranean formation, such as a drilling fluid. If there is an issue with fluid incompatibility, a spacer fluid may be pumped into the subterranean formation prior to introducing the acidizing fluid. The spacer fluid may provide separation between the fluid already present within the subterranean formation and the acidizing fluid being introduced thereto. The MXenes may be introduced to the subterranean formation within the displacement fluid, or introduction of the MXenes may take place after the displacement fluid has traversed the subterranean formation.

The process of stimulating a subterranean formation, particularly a soft or ductile subterranean formation comprising a carbonate mineral, may further weaken the mechanical integrity of the formation matrix, or the subterranean formation may already have inherent structural weakness even without a stimulation operation being performed. In the case of inherent or stimulation-induced structural weakness, proppant embedment, increased structural weakness, and/or weak fracture asperities may result. Treatment of the subterranean formation with MXene flakes in conjunction with a stimulation operation according to the disclosure herein may facilitate MXene flake bonding to the carbonate mineral and improve the mechanical strength of the subterranean formation, thereby decreasing proppant embedment and/or increasing the strength of the fracture asperities.

To determine whether the mechanical strength of the subterranean formation has been increased, the strength of the subterranean formation may be evaluated before and after introducing the plurality of MXene flakes. Suitable testing procedures to evaluate the increase in mechanical strength may include a Brazilian disc test, an unconfined compression test, an ultrasonic pulse velocity test, micro-drilling, a scratch test, indentation (e.g., using the Brinell hardness scale), impulse hammering, the like, and any combination thereof.

Embodiments disclosed herein include:

A. Methods for increasing the mechanical strength of subterranean formations using MXene flakes, the methods including introducing a plurality of MXene flakes into a subterranean formation comprising a carbonate mineral; and depositing at least a portion of the MXene flakes upon a surface of the carbonate mineral, within a plurality of pores of the carbonate mineral, or any combination thereof to increase a mechanical strength of the carbonate mineral.

B. Methods for increasing the mechanical strength of subterranean formations using MXene-containing fluids, the methods including stimulating a subterranean formation comprising a carbonate mineral by performing matrix acidizing, hydraulic fracturing, acid-fracturing, or any combination thereof upon the subterranean formation to form a plurality of flow pathways; after forming the plurality of flow pathways, introducing a plurality of MXene flakes into the subterranean formation; wherein the plurality of MXene flakes are dispersed in a carrier fluid when introduced into the subterranean formation; and depositing at least a portion of the MXene flakes upon a surface of the carbonate mineral, within a plurality of pores of the carbonate mineral, or any combination thereof to increase a mechanical strength of the carbonate mineral.

Each of embodiments A and B may have one or more of the following additional elements in any combination:

Element 1: wherein the MXene flakes comprise a transition metal carbide, a transition metal nitride, a transition metal carbonitride, or any combination thereof.

Element 2: wherein the method further comprises performing a stimulation operation upon the subterranean formation to form a plurality of flow pathways before introducing the plurality of MXene flakes into the subterranean formation.

Element 3: wherein the stimulation operation comprises matrix acidizing, hydraulic fracturing, acid-fracturing, or any combination thereof.

Element 4: wherein the MXene flakes are introduced into the subterranean formation while dispersed in a carrier fluid.

Element 5: wherein the carrier fluid comprises an aqueous fluid.

Element 6: wherein the carrier fluid comprises a non-aqueous fluid.

Element 7: wherein a concentration of MXene flakes in the carrier fluid ranges from about 1 mg/mL to about 10 mg/mL.

Element 8: wherein the MXene flakes have a particle size ranging from about 500 nm to about 10 μm.

Element 9: wherein the MXene flakes have a flake porosity ranging from about 0.01 nm to about 4 nm.

Element 10: wherein the carbonate mineral comprises calcium carbonate.

By way of non-limiting example, exemplary combinations applicable to A and B include, but are not limited to: 1 with 2; 1 with 4; 1 with 8; 1 with 9; 1 with 10; 2 with 3; 2 with 4; 2 with 8; 2 with 9; 2 with 10; 3 with 4; 3 with 8; 3 with 9; 3 with 10; 4 with 5; 4 with 6; 4 with 7; 4 with 8; 4 with 9; 4 with 10; 5 with 7; 5 with 8; 5 with 9; 5 with 10; 6 with 7; 6 with 8; 6 with 9; 6 with 10; 7 with 8; 7 with 9; 7 with 10; 8 with 9; 8 with 10; 9 with 10; 1 with 2 and 4; 1 with 4 and 8; 1 with 8 and 9; and 1 with 9 and 10.

The present disclosure is further directed to the following non-limiting clauses:

Clause 1. A method comprising:

introducing a plurality of MXene flakes into a subterranean formation comprising a carbonate mineral; and depositing at least a portion of the MXene flakes upon a surface of the carbonate mineral, within a plurality of pores of the carbonate mineral, or any combination thereof to increase a mechanical strength of the carbonate mineral.

Clause 2. The method of clause 1, wherein the MXene flakes comprise a transition metal carbide, a transition metal nitride, a transition metal carbonitride, or any combination thereof.

Clause 3. The method of clause 1 or clause 2, further comprising:

performing a stimulation operation upon the subterranean formation to form a plurality of flow pathways before introducing the plurality of MXene flakes into the subterranean formation.

Clause 4. The method of clause 3, wherein the stimulation operation comprises matrix acidizing, hydraulic fracturing, acid-fracturing, or any combination thereof.

Clause 5. The method of any one of clauses 1-4, wherein the MXene flakes are introduced into the subterranean formation while dispersed in a carrier fluid.

Clause 6. The method of clause 5, wherein the carrier fluid comprises an aqueous fluid.

Clause 7. The method of clause 5, wherein the carrier fluid comprises a non-aqueous fluid.

Clause 8. The method of any one of clauses 5-7, wherein a concentration of MXene flakes in the carrier fluid ranges from about 1 mg/mL to about 10 mg/mL.

Clause 9. The method of any one of clauses 1-8, wherein the MXene flakes have a particle size ranging from about 500 nm to about 10 μm.

Clause 10. The method of any one of clauses 1-9, wherein the MXene flakes have a flake porosity ranging from about 0.01 nm to about 4 nm.

Clause 11. The method of any one of clauses 1-10, wherein the carbonate mineral comprises calcium carbonate.

Clause 12. A method comprising:

stimulating a subterranean formation comprising a carbonate mineral by performing matrix acidizing, hydraulic fracturing, acid-fracturing, or any combination thereof upon the subterranean formation to form a plurality of flow pathways;

after forming the plurality of flow pathways, introducing a plurality of MXene flakes into the subterranean formation;

wherein the plurality of MXene flakes are dispersed in a carrier fluid when introduced into the subterranean formation; and depositing at least a portion of the MXene flakes upon a surface of the carbonate mineral, within a plurality of pores of the carbonate mineral, or any combination thereof to increase a mechanical strength of the carbonate mineral.

Clause 13. The method of clause 12, wherein the MXene flakes comprise a transition metal carbide, a transition metal nitride, a transition metal carbonitride, or any combination thereof.

Clause 14. The method of clause 12 or clause 13, wherein the MXene flakes have a particle size ranging from about 500 nm to about 10 μm.

Clause 15. The method of any one of clauses 12-14, wherein the MXene flakes have a flake porosity ranging from about 0.01 nm to about 4 nm.

Clause 16. The method of any one of clauses 12-15, wherein a concentration of the MXene flakes in the carrier fluid ranges from about 1 mg/mL to about 10 mg/mL.

Clause 17. The method of any one of clauses 12-16, wherein the carrier fluid comprises an aqueous fluid.

Clause 18. The method of any one of clauses 12-16, wherein the carrier fluid comprises a non-aqueous fluid.

Clause 19. The method of any one of clauses 12-18, wherein the carbonate mineral comprises calcium carbonate.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
introducing a plurality of MXene flakes into a subterranean formation comprising a carbonate mineral, wherein the carbonate mineral is calcium carbonate, the subterranean formation selected from the group consisting of a limestone formation, a chalk formation, a marble formation, and any combination thereof; and
depositing at least a portion of the MXene flakes upon a surface of the carbonate mineral, within a plurality of pores of the carbonate mineral, or any combination thereof and thereby increasing a mechanical strength of the carbonate mineral.

2. The method of claim 1, wherein the MXene flakes comprise a transition metal carbide, a transition metal nitride, a transition metal carbonitride, or any combination thereof.

3. The method of claim 1, further comprising:
performing a stimulation operation upon the subterranean formation to form a plurality of flow pathways before introducing the plurality of MXene flakes into the subterranean formation.

4. The method of claim 3, wherein the stimulation operation comprises matrix acidizing, hydraulic fracturing, acid-fracturing, or any combination thereof.

5. The method of claim 1, wherein the MXene flakes are introduced into the subterranean formation while dispersed in a carrier fluid.

6. The method of claim 5, wherein the carrier fluid comprises an aqueous fluid.

7. The method of claim 5, wherein the carrier fluid comprises a non-aqueous fluid.

8. The method of claim 5, wherein a concentration of MXene flakes in the carrier fluid ranges from 1 mg/mL to 10 mg/mL.

9. The method of claim 1, wherein the MXene flakes have a particle size ranging from 500 nm to 10 μm.

10. The method of claim 1, wherein the MXene flakes have a flake pore size ranging from 0.01 nm to 4 nm.

11. A method comprising:
stimulating a subterranean formation comprising a carbonate mineral, wherein the carbonate mineral is calcium carbonate, the subterranean formation selected from the group consisting of a limestone formation, a chalk formation, a marble formation, and any combination thereof, by performing matrix acidizing, hydraulic fracturing, acid-fracturing, or any combination thereof upon the subterranean formation to form a plurality of flow pathways;
after forming the plurality of flow pathways, introducing a plurality of MXene flakes into the subterranean formation;
wherein the plurality of MXene flakes are dispersed in a carrier fluid when introduced in the subterranean formation; and
depositing at least a portion of the MXene flakes upon a surface of the carbonate mineral, within a plurality of pores of the carbonate mineral, or any combination thereof and thereby increasing a mechanical strength of the carbonate mineral.

12. The method of claim 11, wherein the MXene flakes comprise a transition metal carbide, a transition metal nitride, a transition metal carbonitride, or any combination thereof.

13. The method of claim 11, wherein the MXene flakes have a particle size ranging from 500 nm to 10 μm.

14. The method of claim 11, wherein the MXene flakes have a flake pore size ranging from 0.01 nm to 4 nm.

15. The method of claim 11, wherein a concentration of the MXene flakes in the carrier fluid ranges from 1 mg/ml to 10 mg/mL.

16. The method of claim 11, wherein the carrier fluid comprises an aqueous fluid.

17. The method of claim 11, wherein the carrier fluid comprises a non-aqueous fluid.

* * * * *